Nov. 13, 1956   S. J. MARTENET   2,770,539
PROCESS FOR PRODUCING A MIXED FERTILIZER
Filed Feb. 15, 1954
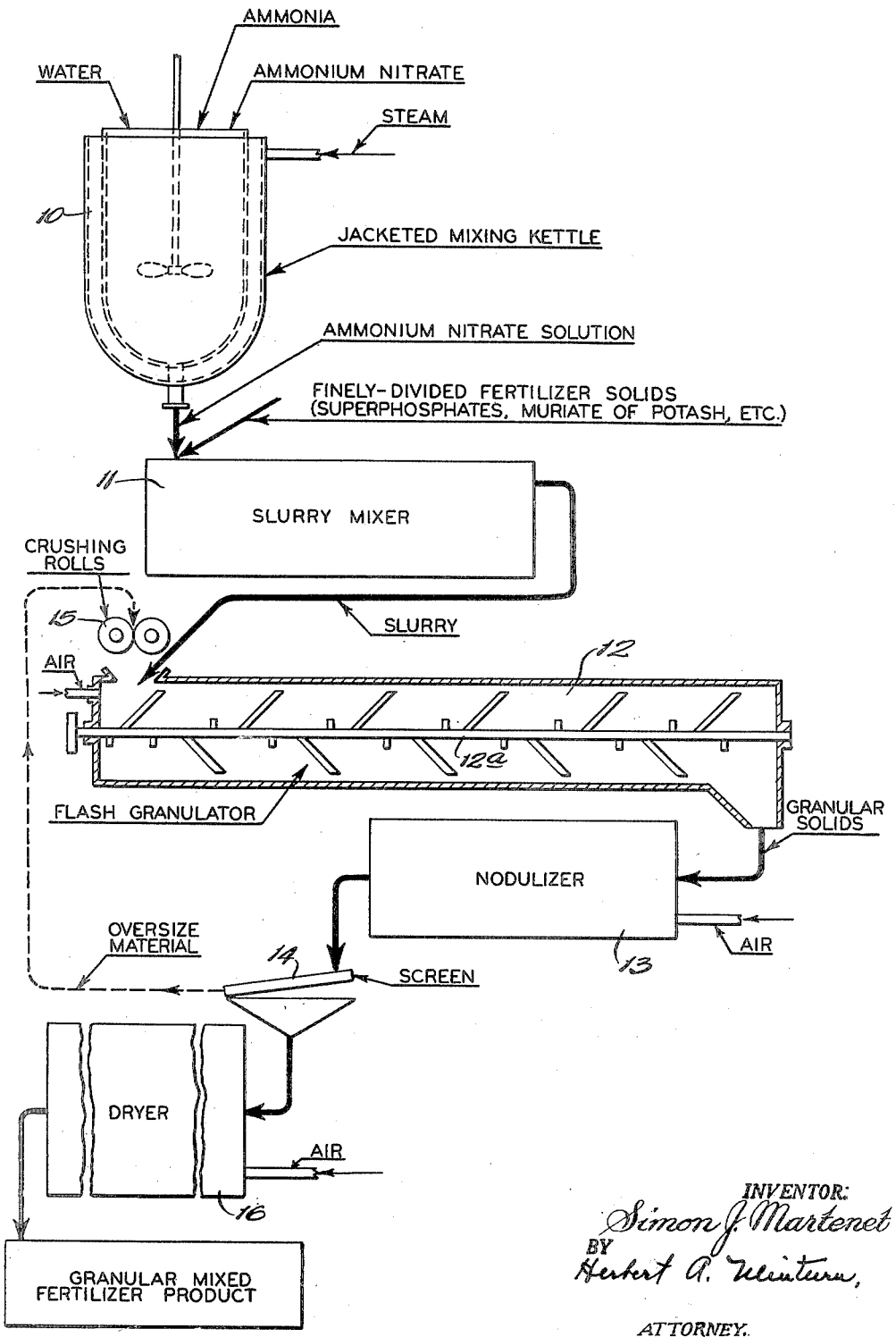
INVENTOR:
Simon J. Martenet
BY
Herbert A. Minturn,
ATTORNEY.

United States Patent Office 2,770,539
Patented Nov. 13, 1956

2,770,539

PROCESS FOR PRODUCING A MIXED FERTILIZER

Simon J. Martenet, Indianapolis, Ind.

Application February 15, 1954, Serial No. 410,247

2 Claims. (Cl. 71—36)

This invention relates to a process for producing a mixed fertilizer and, more particularly, to a process for producing a mixed fertilizer in granular or nodular form.

This application is a continuation-in-part of my copending application Serial No. 328,007, filed December 6, 1952, for Method of Preparing Fertilizer.

As is well known in the fertilizer art, there are three main chemicals that are needed for growing crops: nitrogen, N, phosphoric acid, $P_2O_5$, and potash, $K_2O$. It is common practice to speak of fertilizers as having formulas, such as 10–6–4, 2–12–6, or 0–12–15, which means that these fertilizers have 10, 6, 4, or 2, 12, 6, or 0, 12, 15 percent, respectively, of total nitrogen, N, of available phosphate, $P_2O_5$, and of soluble potash, $K_2O$. Another way of evaluating fertilizer formulas is as "units." Here, one unit is 1% of a ton or 20 lb. Hence the first of the formulas given above would contain 10 units of nitrogen, 6 units of $P_2O_5$, and 4 units of $K_2O$ per ton.

Ammonium nitrate is one of the most available sources of nitrogen and it has a relatively low cost, but its incorporation in fertilizer mixtures has presented a problem due to the hygroscopic character of this compound. Fertilizer mixtures containing ammonium nitrate tend to take up water from the air and cake up in bags or stockpiles, and after caking the handling and application of the fertilizer mixture is made very difficult. For this reason, the ammonium nitrate content of fertilizer compositions is usually limited to around 3% of the total composition, and heretofore fertilizer compositions containing over 10% ammonium nitrate have been completely impractical even if they are to be marketed and used within a few weeks after being produced. Processes for producing an ammonium nitrate-containing mixed fertilizer in a granular form have been used to improve the free flowing character of the product and to counteract its tendency to cake. However, the best granulation processes available have failed to provide an adequate answer to the problem.

Ammonia, either as a gas or in aqueous solution as ammonium hydroxide, has also been used as a nitrogen source in mixed fertilizers, especially where one of the principal ingredients of the mixed fertilizers is an acid-treated phosphate rock such as superphosphate or triple superphosphate. This is possible because the acid-treated phosphate rock can be ammoniated to reduce its acidity, thus forming compounds of the ammonia and the several compounds present in acid-treated phosphate rock. The amount of ammonia which can be incorporated in the mixed fertilizer in this way is limited by its content of super or triple superphosphate. Further, it is not possible to ammoniate super or triple superphosphate to the theoretical limit without causing partial reversion of the available $P_2O_5$ to an unavailable form. For example, theoretically about 9.6 lbs. of ammonia can be reacted per unit of $P_2O_5$ in ordinary superphosphate, but ammoniation of superphosphate because of reversion has usually been limited to less than 5 lbs. per unit of $P_2O_5$. The theoretical limit for triple superphosphate is about 6.4 lbs. of ammonia per unit of $P_2O_5$, but the maximum practical rate, as in the case of superphosphate, is considerably less.

Another problem with mixed fertilizers as heretofore prepared is that they have not been sufficiently homogenous in spite of the use of rather elaborate grinding and mixing procedures, especially when granular products are formed. The granules tend to vary considerably in average composition one from another, and this is undesirable. Further, the preparation of granular mixed fertilizers, especially ammoniated types, has required expensive mechanical equipment for the mixing and ammoniating operations.

It is therefore a general object of this invention to provide a process for producing a mixed fertilizer which substantially overcomes the above problems and disadvantages associated with the preparation of mixed fertilizers, and especially those containing ammonium nitrate and ammonia as the sole sources of nitrogen. More specifically, it is an object of this invention to provide a process for producing a mixed fertilizer by means of which ammonium nitrate can be used to a much greater extent than has heretofore been possible without causing objectionable caking in the product. Another specific object is to provide a process in which the acid-treated phosphate rock component of the mixed fertilizer can be ammoniated to a greater extent and almost up to its theoretical maximum content of ammonium without causing a substantial or prohibitive reversion of the available $P_2O_5$. Another object is to provide a process of the character described for producing a granular mixed fertilizer which is considerably more homogenous than any mixed fertilizers heretofore produced, and in which the average composition of all the granules is substantially the same. Still another object is to provide a process achieving the above advantages while using relatively simple and inexpensive equipment to carry out the process. Further objects and advantages will appear as the specification proceeds.

The process of this invention in one of its embodiments is illustrated diagrammatically in the accompanying flow sheet, which will subsequently be discussed in detail.

In one of its embodiments, the process of this invention is characterized by the forming of a slurry by mixing an aqueous solution of ammonium nitrate with finely-divided fertilizer solids in proportions and at a temperature to form a slurry. An ammonium nitrate solution partially convertible to a solid phase at a lower temperature is used for this purpose. More specifically, the ammonium nitrate solution should be of such concentration that, when it is mixed with solid fertilizer ingredients in the desired proportions at an elevated temperature, a slurry will form which will solidify on cooling, or removal of water, or both. The slurry thus formed is then converted to a solid phase while imparting movement thereto for separating the solidified material into particles. These steps are believed to be entirely novel in the manufacture of mixed fertilizers, and provide the means for accomplishing the above objects, as will subsequently be described.

The process of this invention is susceptible to many different embodiments, and can be used for preparing a wide variety of mixed fertilizer compositions of the same N–P–K content as presently available mixed fertilizers. In addition, the present process can be used to satisfactorily produce mixed fertilizers having compositions different from the mixed fertilizer compositions now on the market. For example, as indicated above, in previous fertilizer mixing processes about 200 lbs. of ammonium nitrate per ton of fertilizer has been considered the maximum practical proportions since higher proportions resulted in hygroscopic products which caked in storage. In contrast, by the process of this invention from 300 to 700 lbs. or more of ammonium nitrate per ton of product can be used with the production of a satisfactory product.

In practicing the process of this invention, an aqueous solution of ammonium nitrate is obtained or prepared, such solutions being commercially available. The ammonium nitrate solution should contain a sufficient concentration of ammonium nitrate so that it is at least partially convertible to a solid phase at a lower temperature by the crystallization of ammonium nitrate. This is not a difficult condition to achieve, of course, because of the very steep solubility curve of ammonium nitrate in water. Around one part of ammonium nitrate is soluble per part of cold water, while up to around nine parts of ammonium nitrate is soluble per part of hot water. For the purposes of this invention the ratio of ammonium nitrate to water in the solution will usually be greater than 3 to 1 and in some cases, up to 9 to 1. The liquid volume of such ammonium nitrate solutions will be considerably greater than the volume of the water contained in the solutions. In other words, the ammonium nitrate acts as an "extender" of the water to provide a large liquid volume, and the augmented liquid volume of the water has an important function in the present process.

The ammonium nitrate solution constituted as described above is then mixed with finely-divided fertilizer solids, such as superphosphate, muriate of potash, and other desired ingredients, at a temperature and in proportions to form a slurry. Slurry conditions can be obtained in this way with using as little as 150 lbs. of water per ton of mixed fertilizer product where sufficient ammonium nitrate is dissolved in the solution to augment the liquid volume for forming a slurry from the solid fertilizer ingredients. The fertilizer ingredients employed will usually provide both $P_2O_5$ and potassium although the omission of $P_2O_5$ or potassium in some formulations may be desirable. Any of the usual $P_2O_5$ sources can be used, but preferably super or triple superphosphate is employed as the $P_2O_5$ source. Similarly, for some purposes, any of the usual potassium sources can be used, such as the common potassium salts like potassium chloride, sulfate, or nitrate. However, for reasons which will subsequently be discussed, potassium chloride is preferred. In addition, minor fertilizer ingredients can be used to provide other plant nutrients, such as the trace elements required by growing plants.

For best results the fertilizer solids should be in a comminuted or finely-divided condition, and this can be accomplished in the usual manner by crushing and grinding and screening procedures. Also, uniformity of particle size is an advantage in the process.

The slurry of finely-divided fertilizer solids and ammonium nitrate solution will be readily convertible to a solid phase because of the concentration of ammonium nitrate in the solution used to prepare the slurry. It is desired to keep the slurry from solidifying during its formation. To accomplish this, the temperature of the slurry should be maintained at least above the saturation temperature of ammonium nitrate in the volume of water present, and preferably considerably above this temperature so that a rather thin, watery, homogenous slurry can be produced. If necessary, the slurry can be heated, although usually sufficient heat can be supplied by the ammonium nitrate solution, and the exothermic reactions occurring during the formation of the slurry which are especially marked when the ammonium nitrate solution also contains ammonia.

With slurry thus formed it is then converted to a solid phase while imparting movement thereto for separating the solidifying material into particles. The solidification of the slurry, as indicated above, can readily be effected by reducing the temperature of the slurry. It can also be effected by removing water from the slurry to increase the concentration of ammonium nitrate, and simultaneously removing water from the slurry and reducing this temperature. In practice, a flash or evaporative cooling of the slurry has been found to produce excellent results, since in this way the temperature of the slurry can be reduced very rapidly and also a considerable amount of water removed therefrom.

It will be apparent that if the slurry is merely cooled without being subjected to movement, it will form a solid crystalline mass of material. However, it has been found that it is entirely possible to impart a movement to the slurry while it is being converted to a solid phase for separating the solidified material into particles. This can be done in a variety of ways; it can be accomplished by high-speed stirring or beating of the slurry. The presently preferred apparatus for this purpose will be discussed in connection with the attached flow sheet, but any one skilled in the art will be able to suggest alternative mechanical means for performing this function.

The solidifying slurry apparently has a thixotropic character, which can be taken advantage of to assist the formation of granules, agglomerates, or nodules from the slurry during the cooling stage. In fact, by the process of this invention it has been found possible to convert a slurry of ammonium nitrate solution and finely-divided fertilizer solids into a homogenous granular material in 8 to 10 seconds. When the slurry is subjected to flash or evaporative cooling and simultaneously beaten within a confined space, the "granulation" is virtually instantaneous. The granular material thus obtained, if desired, can then be dried to desired final moisture content, thereby hardening and setting the granules, to obtain a granular mixed fertilizer product having properties and characteristics novel in the art. The evidence indicates that the fertilizer products produced by the method of this invention differ significantly from prior granular mixed fertilizers in crystalline structure and other properties.

As indicated above, by the method of this invention it is possible to incorporate up to 700 lbs. of ammonium nitrate per ton of product without objectionable caking of the product in storage, even though the storage period is longer than that presently employed. The reason that this is possible is apparently the nearly homogenous distribution of the ammonium nitrate in the product which results from intimately mixing it while in solution with the finely-divided dried materials and subsequent crystalline form solution throughout the mass. In addition, there is probably some solution of the phosphate and potassium compounds during the slurry stage which recrystallizes on cooling, thus tending to make the mass more uniform throughout.

When a potassium salt is employed for one of the fertilizer ingredients as is preferred, a considerable base interchange occurs between the potassium salt and the ammonium nitrate, especially when the potassium salt is potassium chloride. Other potassium salts which are capable of reacting with ammonium nitrate to form potassium nitrate can be used, but potassium chloride is preferred. In other words, the cooling down of the slurry containing dissolved ammonium nitrate and potassium chloride favors the crystallization of potassium nitrate over ammonium nitrate so that a considerable amount of ammonia may be precipitated as ammonium chloride. This should have the effect of reducing the hygroscopic character of the product, and probably permits larger quantities of ammonium nitrate to be used in the process than would otherwise be practical. If desired, potassium chloride or other potassium salts can be dissolved in the ammonium nitrate solution prior to the formation of the slurry to assure the complete solution thereof, and this should favor the desired base exchange reaction.

When superphosphate or triple superphosphate is used as the $P_2O_5$ source, it is preferred to ammoniate the phosphate in the slurry by using an ammonium nitrate solution in which ammonia has been previously incorporated. Alternatively, ammonia can be introduced directly into the slurry, but from a process standpoint this is not as advantageous as forming an ammounium nitrate-ammonia solution. Gaseous ammonia dissolved in water forms ammonium hydroxide and acts as a base. Therefore, the reference to ammonia herein employed in the presence of water will be understood to refer to ammonium hydroxide, as well as free ammonia. The use of the ammonium nitrate solution as a vehicle for treating the phosphate with ammonia permits incorporating up to almost the theoretical amount of ammonia in the phosphate without causing undue reversion of the phosphate to an insoluble form. By having the ammonia dispersed in the large liquid body, it can be brought into intimate contact with the finely-divided phosphate solids, without local over-concentrations which would cause reversion. For example, with the process of this invention reversion is not serious at rates of 7 lbs. or greater of ammonia per unit of $P_2O_5$ in the superphosphate.

Referring to the accompanying flow sheet, there is shown a jacketed mixing kettle 10 in which the ammonium nitrate solution is prepared for addition to the slurry, and preferably ammonia is also dissolved in the ammonium nitrate solution, as indicated in the flow sheet. The water content of the ammonium nitrate solution is proportioned to the weight of the mixed fertilizer product. For example, from about 150 to 280 lbs. of water per ton of finished product may be employed. In general, the amount of water used should be controlled within a range for granulation to avoid powdering when too little water is present, and mudding when too much water is present. The preferred proportion of water will vary somewhat with the desired nitrogen content of the fertilizer as provided by the ammonium nitrate. For example, in producing a 12–12–12 fertilizer, 150 lbs. of water per ton of product would be adequate, while producing a 4–16–16 or 4–12–24 product as much as 280 lbs. of water per ton would be used for best results. The water loss in the cooling stage when evaporative cooling is used should also be allowed for in computing the water requirement.

The concentration of ammonium nitrate in the solution required to produce products containing 4 units of nitrogen or more will usually require the aqueous ammonium nitrate solution to be maintained at a temperature of 130° F., or as much higher as is necessary to keep the ammonium nitrate from salting out of solution. It will be understood, of course, that the concentration of ammonium nitrate will be controlled so as to produce the desired nitrogen content in the final product, and the proportions of the solid fertilizer ingredients will also be selected on this basis. However, it has been found that slurry conditions can be obtained and that the present process can be practiced to produce a wide range of fertilizer compositions including those presently available commercially, and many other compositions which are not commercially available. All that is required is to vary the proportion of water to the other ingredients and maintaining a sufficiently elevated temperature so that the ammonium nitrate is in solution. If desired, some solid ammonium nitrate could be present in the slurry or be added as one of the fertilizer solids, but there is not known to be any particular advantage in this procedure.

As illustrated in the flow sheet, the ammonium nitrate solution is passed into a slurry mixer 11 and is mixed therein with the finely-divided fertilizer solids, which preferably include superphosphate and muriate of potash. The residence time of the slurry in the mixture is not particularly critical, and the mixing can usually be completed in less than a minute. When the fertilizer solids are ground and screened to pass through a 10-mesh screen, as preferred, an essentially homogenous slurry can be readily produced, the fine solids being distributed throughout and in intimate contact with the ammonium nitrate solution. When ammonia is present in the slurry as preferred, this permits the ammoniation of the superphosphate to occur within the short interval in which the slurry is in the mixer. The ammoniation reactions will cause a temperature rise. For example, when ammonium nitrate solution is introduced at 130° F., the temperature in the slurry mixer may rise from 165 to 200° F. This is an advantage in obtaining a thin, watery slurry which can be flowed to the apparatus in which the cooling and granulating step is carried out.

The flow sheet shows the slurry from mixer 11 being passed into the feed end of an apparatus 12 designated as the flash granulator. The construction of flash granulator 12 is similar to that of pug mills heretofore used for mixing clay in the brick industries. It includes one or more shafts 12a equipped with a plurality of mixing and lifting blades which are adapted to convey material from the feed end to the discharge end of the apparatus and at the same time to thoroughly mix the material. In the operation of the flash granulator it has been found desirable to have the blades or mixing flights on shaft 12 arranged so as to lift the incoming liquid slurry into the air and to maintain a large portion of the slurry substantially airborne during the cooling stage in which the slurry is solidified. For this purpose it is desirable to have the bottom of the flash granulator trough-shaped so that the blades can sweep over the bottom of the granulator and prevent the slurry from accumulating and solidifying in the bottom of the granulator. The revolution of the shaft should be quite rapid to accomplish these results, and in practice rotational shaft speeds of around 100 revolutions a minute or greater have been found desirable. This, of course, is much greater than the shaft speed of conventional pug mills.

Any suitable means can be provided for cooling the slurry in the flash granulator 12. In the illustration given, air is blown through the granulator so as to pass over and through the material within the granulator as it is being moved from the feed to the discharge end thereof. In this way the slurry is subjected to flash or evaporative cooling which rapidly reduces the temperature of the slurry and at the same time considerable water is evaporated. In practice, it has been found that around ⅓ of the water in the slurry can be evaporated by the air in this type of apparatus. The rapid rotation of shaft 12 and the blades thereon imparts a movement to the slurry which separates the solidifying material into particles. In this way, it is possible within 8 to 10 seconds to convert a thin, watery slurry to small particles or granules which are essentially homogenous and sufficiently formed to permit them to be screened.

If desired, the granular solids discharged from flash granulator 12 can be passed through a conventional nodulizer 13 where they are subjected to a rolling or tumbling motion to improve their granular form and to remove additional water therefrom so as to partially harden or set the granules, but this is an optional procedure which is not essential to the present invention. In either case, the granular solids thus obtained, although still somewhat soft and mushy, will be sufficiently formed to permit them to be passed through a screen 14 for the removal of oversize material prior to drying the granules. This has the advantage of permitting the oversize material to be returned to the process at the cooling stage by simply passing it through a pair of crushing rolls 15, as illustrated in the flow sheet. When a nodulizer is used prior to screening, the proportion of recycle oversize will be decreased. It may be desirable to screen the crushed material from rolls 15, the oversize being passed into flash granulator 12 and the undersize returned to nodulizer 13 or passed to the dryer.

The screened or sized granules are then passed through a conventional dryer 16 to cure the granules and to harden them by reducing their water content. Such heat drying, however, is not essential and, if desired, storage-curing can be substituted for heat drying. The advantage of the heat drying is that a completely cured product can be obtained ready for marketing and use in a much shorter period of time. In the flow sheet the granular mixed fertilizer product is shown being discharged from dryer 15.

The preferred process as described above can be viewed as consisting of four stages: (1) the slurry stage, (2) the cooling stage, (3) the sizing stage, and (4) the drying stage. In practice, these stages may overlap to a certain extent, but each stage is important to the final result. For example, the cooling and the first portion of the sizing stage can take place in flash granulator 12, where a rough sizing of the solid phase into granules occurs. As discharged from the flash granulator 12, the granules may vary in size more than would be desired in the final product. The granules can be brought to more nearly a uniform size by passing them through nodulizer 13 wherein the shearing action of the blades breaks up the larger granules and the tumbling of the granules has an agglomerating effect on the smaller granules. As indicated above, the sizing action in the flash granulator can be controlled to a certain extent by regulating the liquid volume or water content of the slurry.

This invention is further illustrated by the following specific examples.

Example I

A 12-12-12 fertilizer was prepared by the process described above in connection with the attached flow sheet. The slurry was formed from an aqueous ammonium nitrate-ammonia solution, superphosphate, and muriate of potash. The solution contained 150 parts of water, 60 parts of ammonia, and 545 parts of ammonium nitrate. The solution temperature was 130° F., at which temperature the ammonium nitrate was completely dissolved. To form the slurry, this solution was mixed with 1067 parts of superphosphate and 385 parts of muriate of potash, both being ground and screened to pass through a 10-mesh screen. Due to the ammoniation reactions the temperature of the slurry in the slurry mixer was 170° F., and the slurry was fed to the flash granulator at this temperature.

In the flash granulator the slurry was converted to granular solids in about 10 seconds and discharged at 120° F., approximately one-third of the water having been removed by the evaporative cooling of the slurry. In addition to the water supplied by the ammonium nitrate-ammonia solution, the superphosphate supplied water to the slurry since the superphosphate used contained around 5 to 6% moisture.

The granular material discharged from the flash granulator was fed through a nodulizer in which further moisture was removed and the temperature reduced to 105° F. The discharge from the nodulizer was screened through a 5-mesh screen, the oversize being passed through crushing rolls and returned to the process at the flash granulator. The maximum ratio of wet recycle to fresh fed was 5%. The screened material was passed to a dryer operating with an inlet air temperature of 350° F. and an exit air temperature of 330° F. The product was discharged from the dryer at 190° F. and contained 1% moisture, showing that about 194 parts of water had been evaporated from the slurry stage to the product as discharged from the dryer. The initial slurry contained 10.3% water, the nodulizing feed 7.0%, and the dryer feed 6.0%. There was no nitrogen loss or phosphate reversion in the dryer.

The granular mixed fertilizer product obtained as described in this example was analyzed and found to be of substantially uniform composition from granule to granule, and the granules were rather closely sized. 94.8% of the product ranged from −4 to +35 mesh. Storage tests have shown that this product does not cake up in the bag even after several months of storage under pressure and atmospheric conditions, which would be expected to cause caking of a product containing a much smaller proportion of ammonium nitrate. X-ray diffraction studies of the product show that ammonium chloride is a major constituent of the product, and this confirms that a base exchange between the ammonium nitrate and potassium chloride has taken place.

Example II

Following the same procedure as described in Example I, a 3-10-30, a 7-14-28, and a 4-12-24 fertilizer were prepared. The proportions of the slurry ingredients and operating data for these mixed fertilizers are summarized below:

|  | 3-10-30 | 7-14-28 | 4-12-24 |
|---|---|---|---|
| Slurry Ingredients (lb./ton product): | | | |
| Ammonia | 50 | 70 | 60 |
| Ammonium Nitrate | 57 | 246 | 92 |
| Superphosphate | 958 | 350 | 1,078 |
| Triple Superphosphate | 12 | 455 | 47 |
| Muriate of Potash | 961 | 898 | 769 |
| Water | 240 | 200 | 280 |
| Temperatures (° F.): | | | |
| Solution | 130 | 130 | 130 |
| Slurry in Slurry Mixer | 170 | 175 | 180 |
| Discharge Flash Granulator | 120 | 120 | 120 |
| Dryer Feed (From Nodulator) | 95 | 100 | 95 |
| Dryer Product | 175 | 175 | 200 |
| Dryer Inlet Air | 500 | 450 | 500 |
| Dryer Exit Air | 275 | 230 | 250 |
| Moistures: | | | |
| Initial Slurry | 14.0 | 11.2 | 15.6 |
| Nodulizing Feed | 12.5 | 9.2 | 13.0 |
| Dryer Feed | 10.5 | 6.0 | 9.0 |
| Product | 1.0 | 1.0 | 1.0 |
| Nitrogen Loss in Dryer | 0 | 0 | 0 |
| Phosphate Reversion in Dryer | 0 | 0 | 0 |
| Size range of Product −4+35 mesh percent | 91.3 | 82.3 | 92.2 |

Example III

By the method of this invention, fertilizer compositions having the same formula can be prepared from various ingredients in different proportions. For example, a 4-16-16 fertilizer can be produced by using either ammonia, ammonium nitrate, or both ammonia and ammonium nitrate as the nitrogen source. Typical formulas for producing a slurry from which a 4-16-16 granular mixed fertilizer can be produced are set out below:

| Slurry Ingredients (lbs./ton product) | Formulas | | |
|---|---|---|---|
|  | I | II | III |
| Ammonia | 64.4 | 98 | 0 |
| Ammonium Nitrate | 86 | 0 | 229 |
| Superphosphate | 1,247 | 1,422 | 1,291 |
| Triple Superphosphate | 150 | 0 | 0 |
| Muriate of Potash | 516 | 525 | 525 |
| Water | 270 | 270 | 270 |

As indicated above, an outstanding advantages of the present invention is that much larger amounts of ammonium nitrate can be used in producing a mixed fertilizer than has heretofore been possible. For example, a satisfactory product can be obtained over the range from 300 to 800 pounds of ammonium nitrate per ton of product. When such large amounts of ammonium nitrate are used it is preferred, as already indicated, to also incorporate muriate of potash in the slurry. When the slurry is solidified, the formation of potassium nitrate and ammonium chloride by a base exchange reaction appears to be favored when the muriate of potash is present in excess, that is, greater than 1 mole of the potash per mole of ammonium nitrate, and in many cases it will be desirable to employ as much as 2 moles of the potash per mole of the ammonium nitrate.

While in the foregoing specification specific embodiments of the present invention have been discussed and details thereof have been set forth for purpose of illustration, it will be apparent to those skilled in the art that this invention is susceptible to other embodiments and that many of the details set forth herein can be varied widely without departing from the basic concepts of the invention.

I claim:

1. The continuous process of making a substantially non-hydroscopic mixed fertilizer of particulate form with a final water content as low as one percent with a high nitrogen content derived primarily from ammonium nitrate wherein each discrete particle of the fertilizer product has individually an analysis substantially the same as that of the overall fertilizer, which process comprises intermixing and agitating quickly into a thin watery slurry, a dry, finely divided phosphate material selected from superphosphate and triple superphosphate, and a water solution of ammonium nitrate in a concentration selected for the final fertilizer nitrogen content wherein the total quantity of the ammonium nitrate ranges from 300 to 800 pounds per ton of finished fertilizer and the temperature of the slurry is maintained above the ammonium nitrate salting out temperature ranging upwardly from an approximate minimum of 130 degrees F., the quantity of water in said solution ranging upwardly from approximately 150 pound per ton of finished fertilizer; agitating the slurry and simultaneously cooling it to below said salting out temperature resulting in quick solidification; and continuing the agitation to bring the solidifying product into particulate form.

2. The process of claim 1 in which a finely divided potassium salt selected from the group of potassium chloride, potassium sulphate, and potassium nitrate in a finely divided state is added to said phosphate material to pass through said slurry and effect a basic change with a part at least of said ammonium nitrate.

References Cited in the file of this patent

UNITED STATES PATENTS

| | | |
|---|---|---|
| 1,406,455 | Halvorsen | Feb. 14, 1922 |
| 1,931,768 | Moore | Oct. 24, 1933 |
| 2,025,915 | Tramm | Dec. 31, 1935 |
| 2,036,481 | Kniskern | Apr. 7, 1936 |
| 2,067,931 | Kniskern | Jan. 19, 1937 |
| 2,116,866 | Kniskern | May 10, 1938 |
| 2,287,759 | Hardesty et al. | June 23, 1942 |
| 2,448,126 | Shoeld | Aug. 31, 1948 |
| 2,531,360 | Martin | Nov. 21, 1950 |
| 2,729,554 | Nielsson | Jan. 3, 1956 |

OTHER REFERENCES

Industrial and Eng. Chem. Production of Grained Ammonium Nitrate Fertilizer, Miller et al., vol. 38, No. 7, pages 709, 718, July 1946.